UNITED STATES PATENT OFFICE.

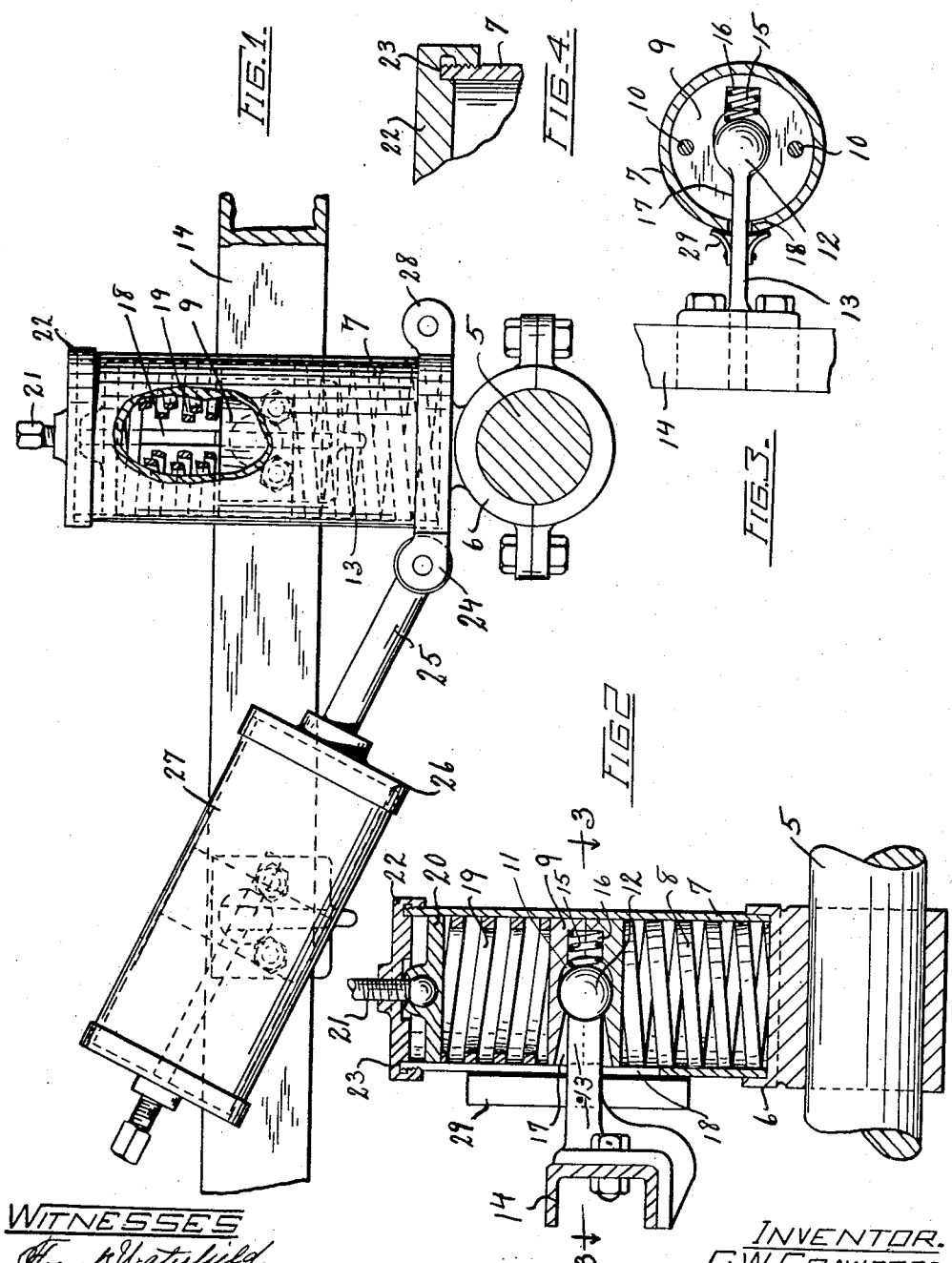

CARY W. CRAWFORD, OF LOS ANGELES, CALIFORNIA.

VEHICLE-SPRING.

1,198,331.  Specification of Letters Patent.  Patented Sept. 12, 1916.

Application filed January 18, 1915. Serial No. 2,831.

*To all whom it may concern:*

Be it known that I, CARY W. CRAWFORD, a citizen of the United States, residing at the city of Los Angeles, in the county of Los Angeles and State of California, have invented new and useful Improvements in Vehicle-Springs, of which the following is a specification.

My invention relates to springs for vehicles which travel over roads and the object thereof is to provide springs for resisting the jar caused by passing over obstructions or into ruts and other springs that prevent an objectionable recoil, said springs being so arranged and mounted that they will yield in any direction to accommodate the body of the vehicle to the unevenness in the road.

A further object is to simplify the construction and arrangement of springs for that purpose, and to provide means to connect the running gear to the body of the vehicle.

In the drawings forming a part of this application: Figure 1 is a side elevation of a portion of an automobile with a pair of springs in place thereon, partly broken away. Fig. 2 is a longitudinal section of the casing of a thrust and rebound spring, with such springs shown in elevation and parts showing the connection to the body of the vehicle. Fig. 3 is a cross-section on the line 3—3 of Fig. 2 with some of the parts in elevation. Fig. 4 is an enlarged detail showing a portion of the top of a spring casing.

In the practical use of my vehicle springs there are two casings with springs therein at or near each corner of the machine and the casings and springs therein and connections are all of the same construction and arrangement for each corner and only the casings and springs and connections at one corner will be described.

In the drawings so much of the left hand rear corner of the vehicle is shown as illustrates my invention.

Upon the axle 5 is mounted a bearing plate 6 in the upper surface of which is received a tubular casing 7 which is secured therein by being electrically welded or otherwise securely fastened. If desired casing 7 and plate 6 could be cast integral. In the lower portion of casing 7 is received thrust spring 8 which bears the load. On the top of spring 8 is the bearing plate 9 which is composed of an upper and a lower member which members are held together by bolts 10. If desired plate 9 could be divided vertically. In the bearing plate is a chamber 11 which is circular in vertical central section to receive the round head 12 of the connecting arm 13. The other end of arm 13 is bolted to the frame 14 of the vehicle. Chamber 11 is elongated to provide a play for head 12 and a spring 15 bears against head 12 and normally keeps it central in plate 9. The greater part of spring 15 is chambered in a recess 16 which leads off chamber 11. The outlet 17 from chamber 11 through which arm 13 passes gradually increases in width in the direction of movement of arm 13 when the vehicle is in use to casing 7. In the other direction outlet 17 is of a width to snugly receive arm 13. A slot 18 is provided in casing 7 for the movement of arm 13.

On the top of plate 9 is rebound spring 19. On the top of spring 19 is tensioning plate 20 on which bears tensioning screw 21. Screw 21 passes through cap 22 screwed upon the top of casing 7. Cap 22 has an annular groove 23 for the reception of the top of casing 7. This groove prevents the top of the casing from compressing and thereby reducing the width of the slot. To provide greater resiliency and strength I provide plate 6 with a lug 24 to which is pivotally connected a rod 25. The other end of rod 25 is connected to plate 26 which is in all respects the duplicate of plate 6 except that it has no lugs like lug 24.

A casing 27 which is a duplicate of casing 7 is secured to plate 26. This casing contains parts which are duplicates of the parts contained in casing 7. Casing 27 with its contained and connected parts is a duplicate of casing 7 and its contained and connected parts and the arm thereof is also fastened to the body of the vehicle at a distance from the arm of the casing 7. These casings and contained parts will be called supplemental spring casings and those connected directly to the axles will be called main spring casings.

Plate 6 may have a lug 28 to which a strut rod (not shown) may be connected. If used the other end of the strut rod would be connected to the frame.

A dust shield 29 is mounted on arm 13 to prevent dirt from entering into the spring case. If desired the dust shield can be mounted on casing 7 or on plate 9.

The spring casings and connected parts form the connecting means whereby the body is connected to the running gear. The springs may be either helical or volute or multiple.

The supplemental spring casings may project to the front or rear of the main casings as desired, depending upon the make of the vehicle and the main spring casings may be connected to the body at or on either side of the vertical plane that passes through the axle, depending on the make of the vehicle.

By this construction a cheap, simple and efficient spring support for the body of vehicles is provided which takes care of both the thrust and rebound.

Having described my invention what I claim is:

1. In a vehicle, means to connect the body and running gear and to relieve the body from the jar of the running gear passing over rough roadway comprising main spring casings secured upon the axles of the running gear at or near the corners of the body of the vehicle; thrust and rebound springs in said casings, said casings having slots therein; bearing plates in said casings, said plates having chambers therein with outlets therefrom; and connecting arms having heads in the chambers of said plates and projecting through the outlets thereof, said arms being adapted for connection to the body of the vehicle.

2. In a vehicle, means to connect the body and running gear and to relieve the body from the jar of the running gear passing over rough roadway comprising main spring casings secured upon the axles of the running gear at or near the corners of the body of the vehicle; supplementary spring casings secured to the main casings, and to the body of the vehicle; thrust and rebound springs in said casings, said casings having slots therein; bearing plates in said casings, said plates having chambers therein with outlets therefrom; and connecting arms having heads in the chambers in said plates and projecting through the outlets thereof, said arms being adapted for connection to the body of the vehicle.

3. In a vehicle, means to connect the body and running gear and to relieve the body from the jar of the running gear passing over rough roadway comprising main spring casings secured upon the axles of the running gear at or near the corners of the body of the vehicle; supplementary spring casings secured to the main spring casings, said supplementary casings projecting toward the central portions of the sides of the body of the vehicle; thrust and rebound springs in said casings, said casings having slots therein; bearing plates in said casings, said plates having elongated circular shaped chambers therein with outlets therefrom; spring recesses opening out of said last chambers; springs in said recesses; and connecting arms having heads in the chambers in said plates and projecting through the outlets thereof, said arms being adapted for connection to the body of the vehicle.

4. In a vehicle, means to connect the body and running gear and to relieve the body from the jar of the running gear passing over rough roadway comprising main spring casings secured upon the axles of the running gear at or near the corners of the body of the vehicle; supplementary spring casings secured to the main spring casings, said supplementary casings projecting toward the central portion of the sides of the body of the vehicle; thrust and rebound springs in said casings, said casings having slots therein; means to increase the tension of said springs when desired; bearing plates in said casings, said plates having elongated circular shaped chambers therein with outlets therefrom; spring recesses opening out of said last chambers; springs in said recesses; and connecting arms having heads in the chambers in said plates and projecting through the outlets thereof, said arms being adapted for connection to the body of the vehicle.

In witness that I claim the foregoing I have hereunto subscribed my name this 29th day of December, 1914.

CARY W. CRAWFORD.

Witnesses:
F. E. TALLMADGE,
SYDNEY LEWIS.

Copies of this patent may be obtained for five cents each, by addressing the "Commissioner of Patents, Washington, D. C."